(12) United States Patent
Shih

(10) Patent No.: US 6,457,996 B1
(45) Date of Patent: Oct. 1, 2002

(54) CONNECTOR TO PDA EXTERNAL KEYBOARD

(75) Inventor: Hsiao-Lei Shih, Taipei (TW)

(73) Assignee: Jess-Link Products Co., Ltd., Taipei (TW)

( * ) Notice: Subject to any disclaimer, the term of this patent is extended or adjusted under 35 U.S.C. 154(b) by 0 days.

(21) Appl. No.: 09/886,023

(22) Filed: Jun. 22, 2001

(51) Int. Cl.[7] ............................................... H01R 25/00
(52) U.S. Cl. ........................ 439/638; 361/680; 361/727
(58) Field of Search ................................ 439/534, 638; 341/22; 345/168; 379/61; 400/82; 361/686, 680, 727

(56) References Cited

U.S. PATENT DOCUMENTS

| | | | | |
|---|---|---|---|---|
| 5,457,453 A | * | 10/1995 | Chiu et al. ..................... | 341/22 |
| 5,625,673 A | * | 4/1997 | Grewe et al. .................. | 379/61 |
| 5,841,424 A | * | 11/1998 | Kikinis ........................ | 345/168 |
| 5,941,648 A | * | 8/1999 | Robinson et al. ............. | 400/82 |
| 6,108,200 A | * | 8/2000 | Fullerton .................... | 361/686 |

* cited by examiner

Primary Examiner—Tho D. Ta
Assistant Examiner—Phuongchi Nguyen
(74) Attorney, Agent, or Firm—Jacobson Holman, PLLC

(57) ABSTRACT

A connector for a PDA external keyboard which includes a male connector, an adjustable slot with a bus bar, and a female connector disposed on a PDA. To connect the keyboard to the PDA, one end of the male connector is fitted to the female connector of the PDA and the other end of the male connector is secured in the slot to connect with the bus bar. The keyboard is compatible with various kinds of PDAs.

2 Claims, 2 Drawing Sheets

CONNECTOR TO PDA EXTERNAL KEYBOARD

BACKGROUND OF THE INVENTION

I. Field of the Invention

This invention relates generally to an improved structure of a connector and, more specifically, to a connector for personal digital assistant (PDA) external keyboard. The connector of an external keyboard for PDAs includes an exchangeable male connector, a slot with a bus bar mounted on the external keyboard, and a female connector installed on PDAs. Through the male connector, one end thereof is fitted into the slot while the other end is connected with the female connector of PDAs, the keyboard can be compatible with all types of PDAs.

II. Description of the Prior Art

Heretofore, it is known to construct a PDA without a virtual keyboard for data input. A PDA of such construction typically provides a writing area on the touch-sensitive screen which responds to the tapping of the writing instrument.

It is also known to construct an external keyboard specially designed for PDAs so that users who are not used to entering data with a pen-like writing instrument on the screen can instead use the keyboard for effective data entry.

Nonetheless, the manufacturers of PDAs and external keyboards do not establish a common standard to ensure compatibility between these two devices, and thus a keyboard may not always be compatible with any PDA. For keyboards and PDAs that are not compatible, a converting device is in demand.

To solve the problem of incompatibility, an external adapter having an internal circuit is needed for signal transmission; however, applying an external adapter of this kind typically leads to an increase in cost for manufacturers.

The present invention improves on the heretofore known connector of external keyboard for PDA by providing a special-designed connector. A male connector fitted on the keyboard connects to the female connector of the PDA. The device features on that a slot mounted on the keyboard with a bus bar installed therein. An exchangeable male connector is fitted into the slot. Through the male connector, the PDA can be connected to any kind of external keyboard for operation.

SUMMARY OF THE INVENTION

It is therefore a primary object of the invention to provide a connector for an external keyboard to match all kinds of PDAs. The connector includes an exchangeable male connector, an adjustable slot incorporating with a bus bar, and a female connector. By the male connector, fitted to the slot, connecting with the compatible female connector on PDA, the external keyboard connects with various kinds of PDAs.

BRIEF DESCRIPTION OF THE DRAWINGS

An embodiment of the invention will now be described by way of example only, with reference to the accompanying drawing, in which.

DESCRIPTION OF THE PREFERRED EMBODIMENT

Figure 1:
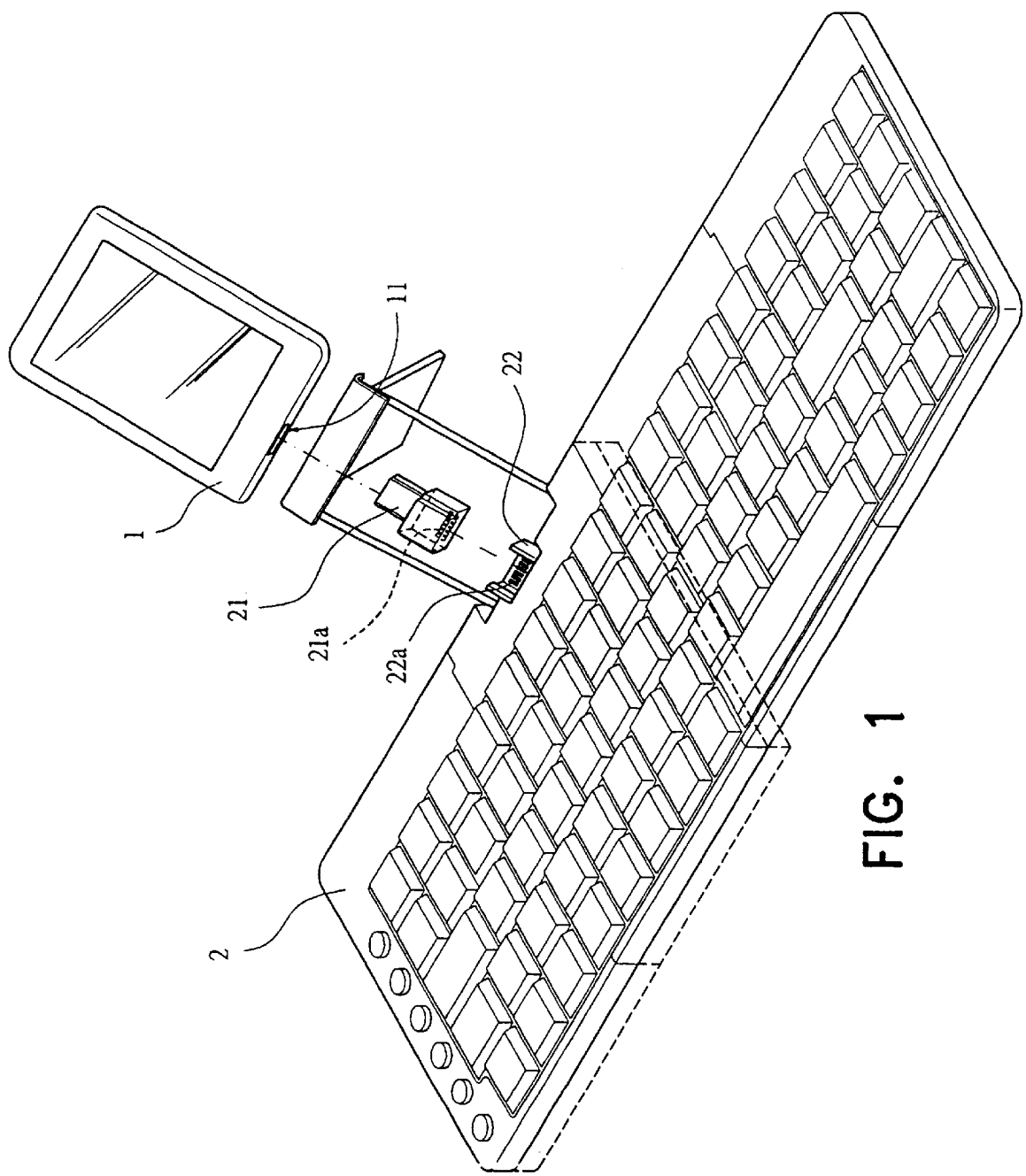
FIG. 1 is an explosive view of a PDA and an external keyboard incorporating the present invention.
Figure 2:
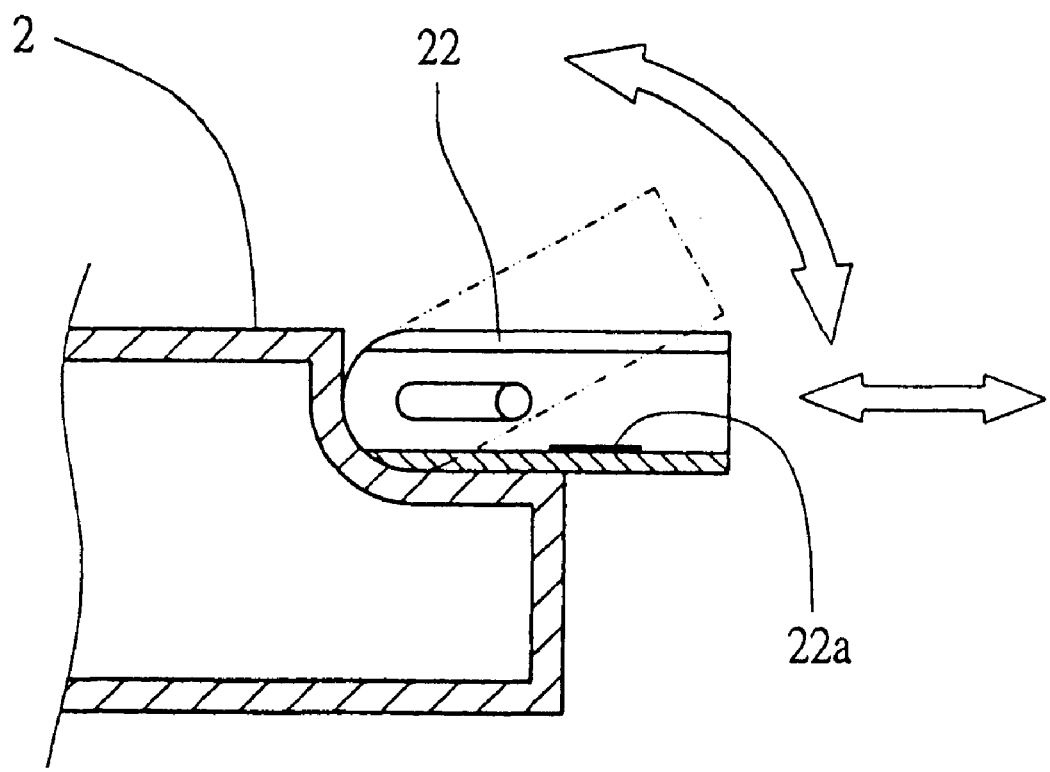
FIG. 2 is an enlarged sectional view of an adjustable slot on the external keyboard taken along a plane showing the variable positions of the slot.

Refer to FIG. 1 and FIG. 2, the present invention is composed of a female connector 11 arranged on a PDA 1 and a male connector 21 connected with a keyboard 2, whereby the keyboard 2 is connected to the PDA 1 through the connectors 11, 21. The improvement of the present invention features on that an adjustable rotary slot 22 is set on the keyboard 2, incorporating a bus bar 22a therein. The male connector 21 that compatible with the female connector 11 of the PDA 1 is fitted into the slot 22 so that the keyboard 2 can be connected to all kinds of PDAs 1.

In accordance with the structure mentioned above, the male connector 21 has contacts 21a which can contact with the bus bar 22a in the slot 22. Once one end of the male connector 21 is fitted into the slot 22, the bus bar 22a in the slot 22 links to the internal circuit of the keyboard 2 through the contacts 21a. The other end of he male connector 21 connects to the female connector 11 on the PDA 1. Thus with the connector of the present invention, the keyboard 2 can be linked to the PDA 1 regardless of different manufacturing standards.

Since the male connector 21 is fitted to the bus bar 22a directly on the contacts 21a, the male connector 21 can be connected to the keyboard 2 without any conversion of electrical signals.

The male connector 21 can be made to match the specifications of any given PDA. Also, the slot 22 is located at the rear side of the keyboard 2 and can be turned upwards or downwards to adjust the standing position of the PDA 1 connected to the keyboard 2.

When not in use, the body of the slot 22 can be moved into the keyboard 2 for convenient storage. Further, the keyboard 2 can be constructed in a foldable form, making it easier for carrying and storage.

While only one embodiment of the present invention has been shown and described, it will be understood that various modifications and changes could be made thereunto without departing from the spirit and scope of the invention disclosed.

What is claimed is:

1. A connector connecting a personal digital assistant and an external keyboard comprising
    an adapter,
    a slot arranged on the external keyboard,
    a female connector disposed on the personal digital assistant,
    said external keyboard connecting with said personal digital assistant by one end of said adapter removably fitted into said slot of said external keyboard while the other end of said adapter connecting with said female connector of said personal digital assistant;
    said slot of said external keyboard having a bus bar therein and said slot being pivotally and slidably adjustable for adjusting a standing position of the personal digital assistant, said slot being connectable with said one end of said adapter for connecting said external keyboard with various kinds of personal digital assistants depending upon a configuration connection between the personal digital assistant and the other end of said adapter.

2. A connector for a PDA external keyboard as claimed in claim 1, wherein the external keyboard is foldable, at least being folded once to half a size of the external keyboard.

* * * * *